PATENTED OCT. 1, 1830.
6174X
M. URFFER.
MACHINE FOR CLEANING ALL KINDS OF GRAIN FROM THEIR CHAFF, DUST, EARS, &c.
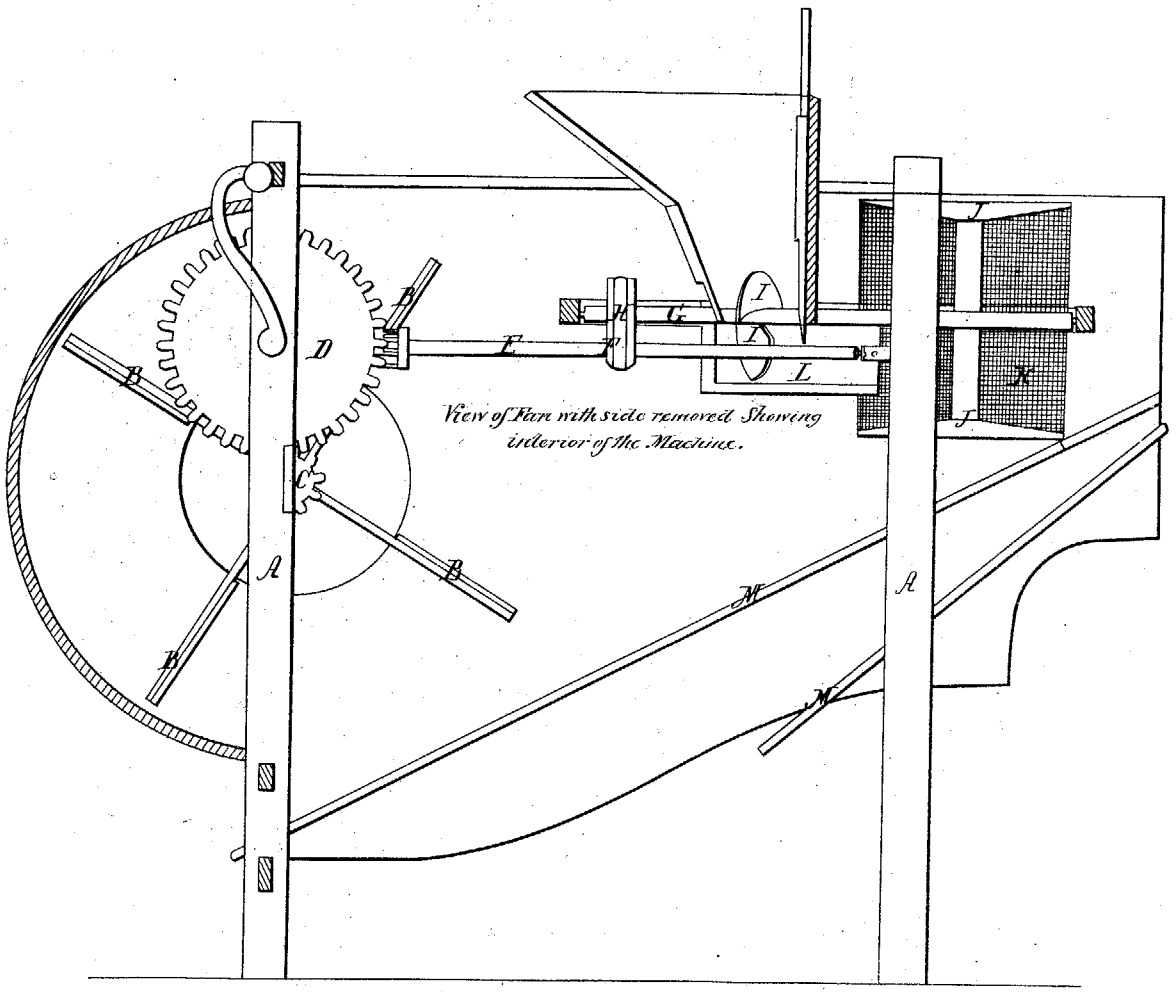

No. 12[illegible]
Oct. 1. 1830

Michael Ueffer 6174X
Letters Patent

The schedule referred to in these Letters Patent and making part of
the same containing a description in the words of the said Michael
Ueffer himself of his improvement in cleaning all kinds of grain from
their chaff, ears, dust &c

---

To all to whom these presents shall come. Be it known that I Michael
Ueffer of Upper Milford Township in the County of Lehigh & State of
Pennsylvania have invented a new & useful improvement in the ma-
chine for cleaning all kinds of grain from their chaff, dust, ears &c.
& that the following is a full & exact description of the construction &
operation of the said Machine as invented & improved by me.
This machine or instrument is intended to be a very useful implement
to the farmer rural economist & dealer in grain by enabling him to
separate the grain from their chaff, dust, ears &c by an operation much
easier than by any other known method as he believes now or heretofore
in use, At any rate he offers it as containing a new & useful mode of
effecting the purpose for which it is constructed. The description of his
invention & discovery is contained in the following words & terms that is
to say. He forms a frame of suitable scantling 5 or 6 feet long one foot
8 inches wide with a depth or height about 4 feet with 5 [illegible]
legs, or feet 5 or 8 cross bars & is formed to a box with suitable boards like
the old fashioned wind Mill. within the box there is a shaft with 4
fans outside there is a small cogged wheel of about 14 cogs & is fastened
to the fan shaft, above this is a large wheel with 48 cogs, & at this is a hand
le, outside of the box runs another shaft & at this is likewise a cogged wheel
with 12 cogs at the end & a pulley about in the middle of the machine
said shaft may be fastened to the legs or any other way, inside there is
another shaft of about 2 feet [illegible] long & rests on 2 cross bars & at this is
likewise a pulley at the one end so as to correspond with the outside
shaft pulley. [illegible] at each shaft is a [illegible] with [illegible]

[illegible]

6174X

Patent 7 3/4 inches long & at the same across are slats as long as the seive. the
seive is about 14 inches long & about 14 1/2 wide in diameter & is cylin-
dric & made of suitable wire. below this shaft is a semicylinder of about
10 inches long & open at one end & wide enough to suit the concave the seive
has somewhat slant, at the hinder part a hind [illegible] has one [illegible]
on each side one so as to bring the seive below and above level. on the
box there is a hopper wide enough to suit the semicylinder, below the
seive there are likewise 2 boards running nearly from one end slant-
thro' the box to the other end. Now by setting the largest cogged wheel
in motion by human or any other strength or power, it turns the then
shaft inside & the other outside of the box & from turning the outside
shaft the inside or seive [illegible] shaft is turned by a strap or cogged
wheel, then the concave, & also the seive is in motion so as by turning
the largest cogged wheel about 3/4 round the seive & concave turn
once. the concave is in the semicylinder & by throwing grains in
the hopper it falls down in said cylinder, from where the concave
works it out into the seive where the kernels fall thro' & glide along
the slant board & the dust chaff &c fall out behind as in the
common way. The peculiar & special merit of this invention
discovery & improvement is this to wit: the revolving seive so as by
turning it makes its regular revolution. also the semicylinder where
the concave makes its revolution by which the work is rendered
much better & easier & this the petitioner solicits to secure by Letters Patent
to the end that he may enjoy the exclusive benefit thereof & also the
reel & inside shaft as well as the screws so as to bring the seive
under & above level. This he begs also to embrace in his Patent.
For the purpose of rendering his invention & improvement afore-
said more perfectly plain & intelligible he forwards with these pres-
ents to the Secretary of State for safe keeping in the Patent Office a
model exhibiting the whole of his machine as relates to its princi-
ple & manner of acting & of the several parts entering into the com-
position of the same. done by the said Michael [illegible] as & for
his true specification at upper Milford Township in the County of
Lehigh 6174X 229

State of Pennsylvania this 23 day of August in the year
one thousand eight hundred and thirty 1830.

Witnesses
Jacob Kreidel
Joseph Strawn

Michael Ueffer

Patented Oct 18 1830

Ex.
Chf.

924 ndx